US008382354B2

(12) United States Patent
Kim et al.

(10) Patent No.: US 8,382,354 B2
(45) Date of Patent: *Feb. 26, 2013

(54) LIGHTING MODULE AND LIGHTING APPARATUS INCLUDING THE SAME

(75) Inventors: Han Gyoul Kim, Seoul (KR); Hwayoung Kim, Seoul (KR); Il Yeong Kang, Seoul (KR); Hyunha Shin, Seoul (KR); Sang Hoon Lee, Seoul (KR); Jin Wook Kim, Seoul (KR); Hyong Jin Kim, Seoul (KR); JunYoung Byun, Seoul (KR); Jaemyeong Noh, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,967

(22) Filed: May 15, 2012

(65) Prior Publication Data

US 2012/0224392 A1      Sep. 6, 2012

Related U.S. Application Data (63) Continuation of application No. 13/080,440, filed on Apr. 5, 2011, now Pat. No. 8,231,258.

(30) Foreign Application Priority Data

| Apr. 10, 2010 | (KR) | 10-2010-0033030 |
| Apr. 10, 2010 | (KR) | 10-2010-0033031 |
| Apr. 10, 2010 | (KR) | 10-2010-0033051 |
| Sep. 27, 2010 | (KR) | 10-2010-0092982 |
| Dec. 3, 2010 | (KR) | 10-2010-0122751 |

(51) Int. Cl.
*F21V 7/04*      (2006.01)

(52) U.S. Cl. .......... 362/606; 349/58; 362/608; 362/609; 362/612; 362/630; 362/632; 362/218; 362/294

(58) Field of Classification Search ............... 362/27, 362/97.3, 606, 608, 612, 613, 630–634, 609, 362/611, 617, 218, 294, 373; 349/58
See application file for complete search history.

(56) References Cited

U.S. PATENT DOCUMENTS
(Continued)

FOREIGN PATENT DOCUMENTS

| DE | 19644875 | 4/1998 |
| DE | 19755658 | 6/1999 |

(Continued)

OTHER PUBLICATIONS

European Search Report for EP 11161333 dated Oct. 5, 2011.

*Primary Examiner* — Stephen F Husar
(74) *Attorney, Agent, or Firm* — Lowe Hauptman Ham & Berner LLP (57) ABSTRACT

The lighting module includes: a case including an opening from which light is emitted, a base portion corresponding to the opening, and a seat on at least one side of the base portion; a light source unit disposed on the seat; a light guide plate placed within the case and optically connected with the light source unit; and a diffusing plate placed within the case and placed below the light guide plate, wherein the lighting source unit includes a substrate, a plurality of light emitting diodes (LEDs) disposed on the substrate, and a sub-reflector which is disposed on the substrate and covers the plurality of the LEDs, and wherein at least 90% of the light emitted from the LEDs is directly irradiated onto the light guide plate.

20 Claims, 8 Drawing Sheets

U.S. PATENT DOCUMENTS

| | | | |
|---|---|---|---|
| 8,231,258 B2 * | 7/2012 | Kim et al. | 362/609 |
| 2005/0265051 A1 | 12/2005 | Yamamoto et al. | |
| 2007/0133193 A1 | 6/2007 | Kim | |
| 2008/0037284 A1 | 2/2008 | Rudisill | |
| 2009/0086504 A1 | 4/2009 | Kim | |
| 2009/0147504 A1 | 6/2009 | Teeters | |
| 2009/0237958 A1 | 9/2009 | Kim | |
| 2010/0073905 A1 | 3/2010 | Hsin-Nung | |

FOREIGN PATENT DOCUMENTS

| | | |
|---|---|---|
| EP | 2163701 | 3/2010 |
| WO | 02/052192 | 7/2002 |
| WO | 2007/115736 | 10/2007 |
| WO | 2008/041185 | 4/2008 |

* cited by examiner

LIGHTING MODULE AND LIGHTING APPARATUS INCLUDING THE SAME

CROSS-REFERENCE TO RELATED APPLICATIONS

This application is a continuation of U.S. patent application Ser. No. 13/080,440 filed on Apr. 5, 2011 and issued as U.S. Pat. No. 8,231,258, which claims priority to Korean Patent Application Nos. 10-2010-0033030 filed Apr. 10, 2010; 10-2010-0033031 filed Apr. 10, 2010; 10-2010-0033051 filed Apr. 10, 2010; 10-2010-0092982 filed Sep. 27, 2010; and 10-2010-0122751 filed Dec. 3, 2010 of which are hereby incorporated by reference in their entirety.

BACKGROUND

1. Field

This embodiment relates to a lighting module including a plurality of lighting emitting devices and creating light, and to a lighting apparatus including the same.

2. Description of the Related Art

In general, an electric bulb or a fluorescent lamp is commonly used as an indoor or outdoor lighting lamp. However, the electric bulb or the fluorescent lamp has a short life span, so that it should be frequently changed. Moreover, a conventional fluorescent lamp is degraded due to elapse of time for its use. As a result, it is often that its illuminance is gradually decreased.

In order to overcome such problems, a lighting apparatus is now being developed by using a light emitting device (hereinafter, referred to as LED). The LED is easy to control and has a rapid response speed, high electro-optic conversion efficiency, a long life span, low power consumption and high luminance. The LED is also used to create emotional lighting.

Meanwhile, for the many of the lighting apparatus using LED, they are being manufactured with limited form or shape according to the installation space. Therefore, lighting apparatus having high degree of freedom in usage or space is required.

SUMMARY

One embodiment of the present invention is a lighting module. The lighting module includes: a case including an opening from which light is emitted, a base portion corresponding to the opening, and a seat on at least one side of the base portion; a light source unit disposed on the seat; a light guide plate placed within the case and optically connected with the light source unit; and a diffusing plate placed within the case and placed below the light guide plate. The lighting source unit includes a substrate, a plurality of light emitting diodes (LEDs) disposed on the substrate, and a sub-reflector which is disposed on the substrate and covers the plurality of the LEDs. At least 90% of the light emitted from the LEDs is directly irradiated onto the light guide plate.

Another embodiment of the present invention is a lighting module. The lighting module includes: a case including an opening from which light is emitted, a base portion corresponding to the opening, and a seat on at least one side of the base portion; at least one light source unit which includes at least one light emitting device and is disposed on the seat; a light guide plate placed within the case and optically connected with the light source unit; and a diffusing plate placed within the case and placed below the light guide plate. The base portion of the case includes a plurality of recesses on a side thereof.

Further another embodiment of the present invention is a lighting apparatus. The lighting apparatus includes: a first lighting module, a second lighting module and a connection member. The first lighting module includes: a first case including a first opening from which light is emitted, a first base portion corresponding to the first opening, and a first seat on at least one side of the first base portion; a first light source unit which is disposed on the first seat an includes a first light emitting device and a first sub-reflector covering the first light emitting device; a first light guide plate placed within the first case and optically connected with the first light source unit; and a first connector disposed on an external surface of the first case. The second lighting module includes: a second case including a second opening from which light is emitted, a second base portion corresponding to the second opening, and a second seat on at least one side of the second base portion; a second light source unit which is disposed on the second seat and includes a second light emitting device and a second sub-reflector covering the second light emitting device; a second light guide plate placed within the second case and optically connected with the second light source unit; and a second connector disposed on an external surface of the second case. The connection member is coupled to the first connector and the second connector, so as to mechanically connect and fix the first lighting module and the second lighting module.

DETAILED DESCRIPTION OF EMBODIMENT

In the drawings, a thickness or size of each layer is shown roughly, exaggeratedly, or briefly for convenience sake of the description or for a definite description. In addition, a size of each element does not reflect entirely real size.

In addition, for the description of the embodiments, in the case of describing as forming each element "on" or "under" another element, "on" or "under" includes all of being formed as contacting "directly" with each other or as one or more other element allocating between "indirectly" formed things. In addition, in the case of describing as "on" or "under", "on"

or "under" may include a meaning of not only upward direction but also downward direction with respect to an element.

Figure 1:
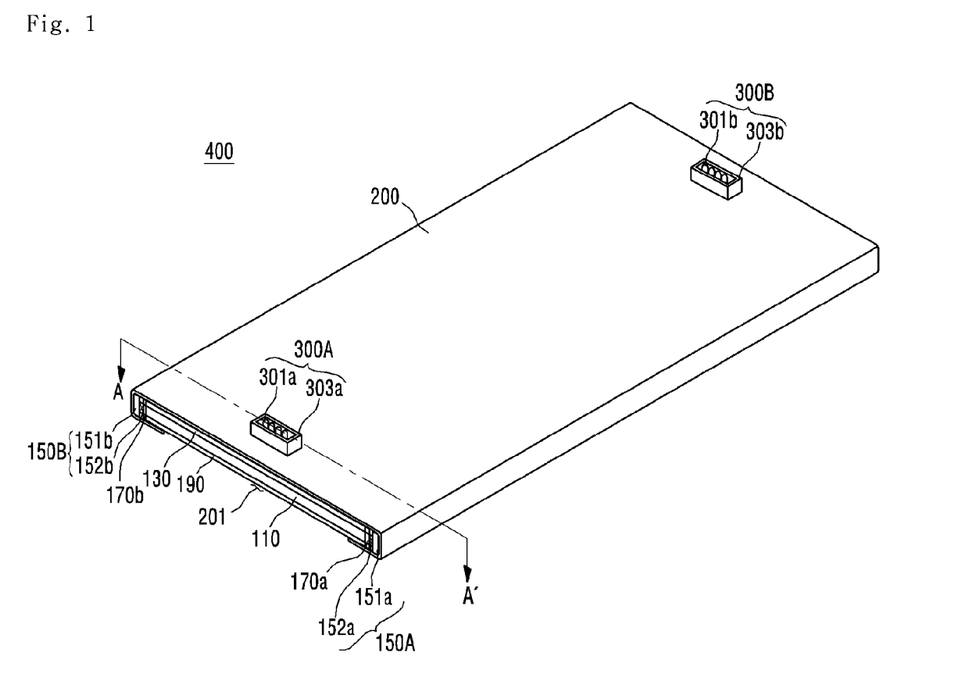
FIG. 1 is a perspective view for describing a structure of a lighting module according to an embodiment of the present invention.
Figure 2:
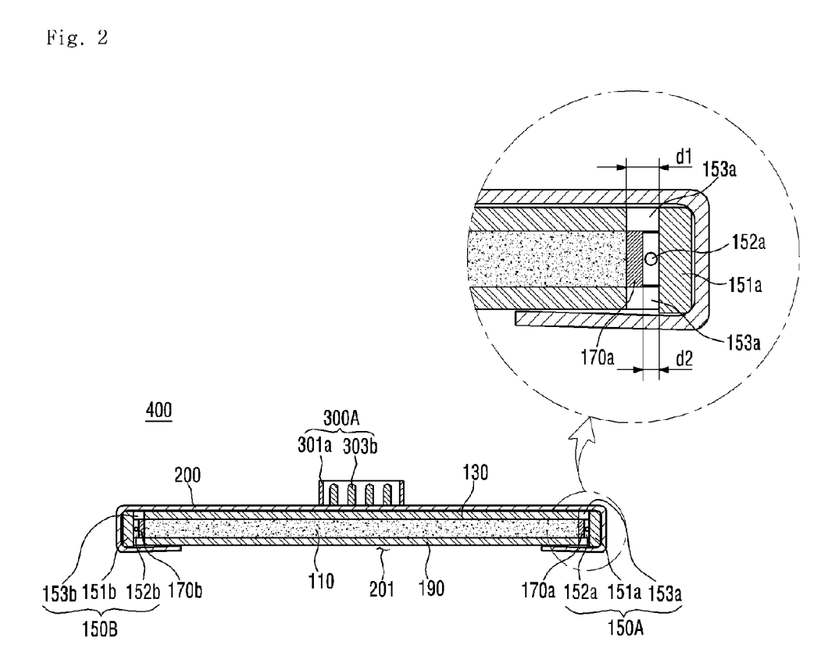
FIG. 2 is a cross sectional view for describing a structure of a lighting module according to an embodiment of the present invention.

FIG. 1 is a perspective view for describing a structure of a lighting module according to an embodiment of the present invention, and FIG. 2 is a cross sectional view for describing a structure of a lighting module according to an embodiment of the present invention.

Referring to FIG. 1 and FIG. 2, a lighting module 400 includes a case 200, a first light source unit 150A, a second light source unit 150B, a first luminescent film 170*a*, a second luminescent film 170*b*, a light guide plate 110, a diffusing plate 190, a reflector 130, a first connector 300A, and a second connector 300*b*.

The case 200 may be manufactured by assembling a plurality of flanges or may be manufactured in the form of a plate by using an extrusion molding method. A first and a second seat 202*a*, 202*b* where the light source unit can be placed on are formed on the case 200 by bending twice the both ends of the plate of the plate respectively as FIG. 6*a*. The both ends of the plate face each other, and an opening 201 is defined by the both ends of the plate. The case 200 has a constant cross section of which both sides are parallel with each other in the longitudinal direction thereof.

In addition, the case 200 may include at least one or more projection 250*a* extended from one side. Such projection fixes and supports the light guide plate seated within the case. As a result, it can prevent displacement of the light guide plate due to external impact and improve alignment characteristic between internal structures of the case.

The first light source unit 150A and the second light source unit 150B each have a substrate 151*a*, 151*b*, a light emitting diode 152*a*, 152*b* disposed on the substrate, and a sub-reflector 153*a*, 153*b* covers the plurality of the light emitting diodes, and are inserted into the first and a second seat 202*a*, 202*b* of the case so as to place a side of the substrate the light emitting diode is disposed on to face each other.

Meanwhile, the end of the surface of the sub-reflector 153*a*, 153*b* is projected further toward the direction the light is irradiated onto than the end of the light emitting diode 152*a*, 152*b* disposed on the substrate 151*a*, 151*b*. That is, the distance d1 between the substrate 151*a*, 151*b* and the end of the surface of the sub-reflector 153*a*, 153*b* is greater than the distance d2 between the substrate 151*a*, 151*b* and the end of the light emitting diode 152*a*, 152*b*.

The reason for this is to prevent the light reflected from the light guide plate 110 from being irradiated onto the light emitting diode 152*a*, 152*b* when the light emitted from the light emitting diode 152*a*, 152*b* is irradiated onto the light guide plate 110 through the luminescent film 170*a*, 170*b* or is irradiated onto the light guide plate 110 directly without the luminescent film 170*a*, 170*b*. That is, the sub-reflector 153*a*, 153*b* blocks the possible path of the light irradiated onto the light emitting diode 152*a*, 152*b* in advance to reflect the reflected light from the light guide plate 110 back to the light guide plate 110. Therefore, the optical efficiency of the lighting module will be improved.

The light emitting diodes included in the first light source unit 150A and the second light source unit 150B emit a light with same color, but they may emit a light with different color. Therefore, creating light with various colors can be done by combination of two different colors, so that emotional lighting apparatus can be created. The light emitting diode 152*a*, 152*b* may emit a light with at least one of blue, red, and green.

While not shown, translucent resin seal the light emitting diode at the top portion of the light emitting diode, so as to enable the light emitting diode to emit a light with its own color. However, when emitting a light with its own color, for example, when the light emitting device is blue light emitting diode, the fluorescent material included in the translucent resin may include at least one or more of a garnet based material (YAG, TAG), a silicate based material, a nitride based material, and an oxynitride based material.

The natural light (white light) can be created by including only a yellow fluorescent material in the translucent resin. However, it may further include a green fluorescent material or a red fluorescent material so as to increase the color rendering index and decrease color temperature.

In addition, when various kinds of fluorescent material are mixed in the translucent resin, regarding the addition ratio according to the color of the fluorescent material, the green fluorescent material may used more than the red fluorescent material, and the yellow fluorescent material may used more than the green fluorescent material.

YAG of a garnet based material, a silicate based material, and an oxynitride based material may be used as a yellow fluorescent material, a silicate based material and an oxynitride based material may be used as a green fluorescent material, and a nitride based material may be used as a red fluorescent material.

Besides mixture of various kinds of fluorescent material, the translucent resin may consist of separately divided layers of a layer with a red fluorescent material, a layer with a green fluorescent material, and a yellow fluorescent material.

Such a light emitting diode may be lateral type or vertical type, and may emit a light with blue, red, yellow, or green.

Such fluorescent material may be applied to the first luminescent film 170*a*, and the second luminescent film 170*b* described later.

The light guide plate 110 is placed along the direction of the path of the light emitted from the first light source unit 150A and the second light source unit 150B, and inserted within the case along the longitudinal direction of the case 200. Here, the both ends of the light guide plate 110 are inserted into the first and the second seat 202*a*, 202*b*, and emit the light emitted from the first light source unit 150A and the second light source unit 150B toward the opening 201.

The first luminescent film 170*a* and the second luminescent film 170*b* is placed respectively between the first light source unit 150A and the second light source unit 150B, and include various fluorescent material inside. Such a first luminescent film 170*a* and a second luminescent film 170*b* may convert a part of the wavelength of the light emitted from the first light source unit 150A and the second light source unit 150B so as to convert the color of the light.

While not shown, the first luminescent film 170*a* and the second luminescent film 170*b* may include translucent resin and a fluorescent material contained within the translucent resin. A curing agent or an additive agent may be included within the transparent resin. The curing agent cures the transparent resin. The additive agent disperses uniformly the fluorescent material within the transparent resin. A diffusing agent may be included within the transparent resin. The diffusing agent improves the refractive index of a light source, thus increasing the excitation ratio of the fluorescent material.

The light diffusing plate 190 is placed between the light guide plate 110 and the opening 201 and inserted within the case 200 to diffuse and emit the light emitted from the light guide plate 110. Here, the both ends of the diffusing plate 190 are inserted into the first and the second seat 202*a*, 202*b* of the case. In addition, the end of the diffusing plate 190 is substantially aligned with the end of the light guide plate 110. The reason for this is to have a stable support structure among the light guide plate 110, the luminescent film 170*a*, 170*b*, the diffusing plate 190, and the sub-reflector 153*a*, 153*b*. That is because the end of the diffusing plate is contact with the end of the sub-reflector and the end of the light guide plate is contact with the luminescent film at a same time so as to substantially fix each element stably.

In addition, it is to irradiate the irradiated light to the light guide plate 100 and the diffusing plate 190 and emit the irradiated light to the opening 201 without optical loss due to irradiation to the case when the end of the diffusing plate 190 is substantially contact with at least the sub-reflector and the light emitted from the light emitting diode is irradiated onto the light guide plate 100 through the luminescent film or is irradiated onto the light guide plate directly without the luminescent film. As a result, the optical efficiency characteristic is improved.

The reflector 130 is placed above the light guide plate 110, reflects the emitted light from the light guide plate 110 to the direction to the diffusing plate 190, and the both ends of the reflector 130 is inserted into the first and the second seat 202a, 202b of the case like the both ends of the diffusing plate. In addition, the end of the reflector is also aligned with the end of the light guide plate so as to have a stable support structure among the light guide plate 110, the luminescent film 170a, 170b, the diffusing plate 190, the sub-reflector 153a, 153b, and the reflector 130. Such a reflector may be omitted from a lighting module if the reflection characteristic of the inner surface of the case is good.

The first connector 300A and the second connector 300B are disposed on the external side face of the case 200. The external side face of the case can be an external side face of a base portion 250 of the case or an external side face of a first and the second extending portion 210a, 210b as described later in FIG. 4. However it is desirable that the first connector 300A and the second connector 300B are disposed on the external side face of the base portion 250 of the case along the longitudinal direction of the case at the middle of the both ends. The first connector 300A and the second connector 300B respectively include a plurality of connection pins 301a, 301b arranged inside thereof and an external case 303a, 303b covering the plurality of connection pins.

At least one of such a first connector 300A and a second connector 300B functions as connection member to connect with another lighting module 400 including the case 200. As such, because the lighting module according to the embodiment of the present invention consists of a single module to emit a light, the lighting module itself can be used as a lighting apparatus.

Figure 3:
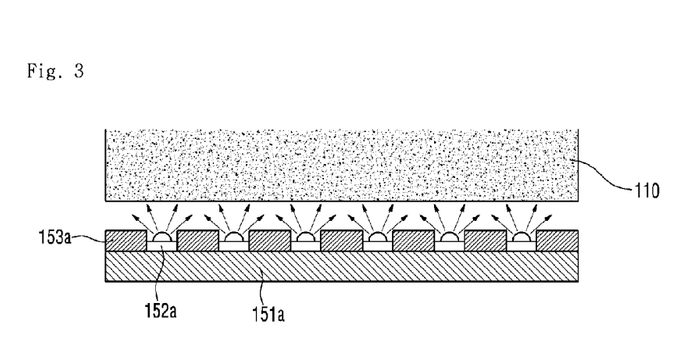
FIG. 3 is an embodiment of the present invention for describing optical efficiency according to allocation structure of a sub-reflector.

FIG. 3 is an embodiment of the present invention for describing optical efficiency according to allocation structure of a sub-reflector.

Referring to FIG. 3, the emitted light from the light emitting diode 152a is irradiated onto the direction to the light guide plate 110 with an orientation angle. Here, the sub-reflector 153a is placed to protrude from the substrate with predetermined distance so as to irradiate 90% of the emitted light to the light guide plate directly. That is, most of the emitted light from the light emitting diode is not irradiated onto the sub-reflector 153 covering the light emitting diode disposed on the substrate 151a.

Therefore, because most of the light emitted from the light emitting diode is not irradiated onto the sub-reflector, and the sub-reflector prevents the light irradiated onto the light guide plate from reflecting and irradiating onto the light emitting diode in advance and reflects the light back to the light guide plate, the optical efficiency can be improved.

In addition, the light having an outermost orientation angle among the light emitted from the light emitting diode is not irradiated onto the sub-reflector but is irradiated onto the light guide plate directly so as to maximize the optical efficiency.

Meanwhile, when a single lighting module is used as a lighting apparatus, one of the first connector and the second connector can be an electrical connection path supplying power to the lighting module, however, when a plurality of lighting modules placed and connected in a line, the connector disposed on the end of the case of the lighting module placed outermost can be an electrical connection path supplying power.

As a result, a plurality of lighting modules becomes a lighting apparatus so as to enlarging the light emitting range. In addition, because the lighting module according to the embodiment of the present invention consists of a single module to emit a light, the lighting module itself can be used as a lighting apparatus.

Figure 4:
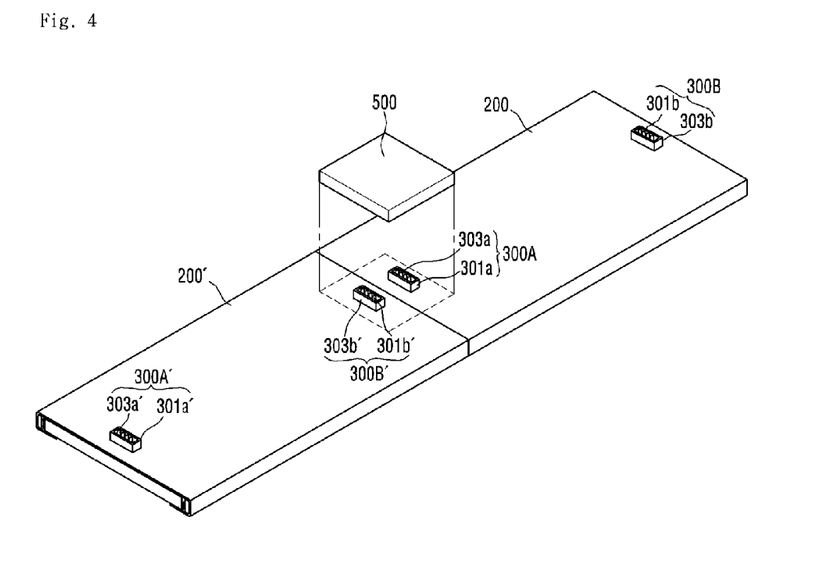
FIG. 4 is an embodiment of the present invention for describing a connection structure of a plurality of lighting modules.
Figure 5:
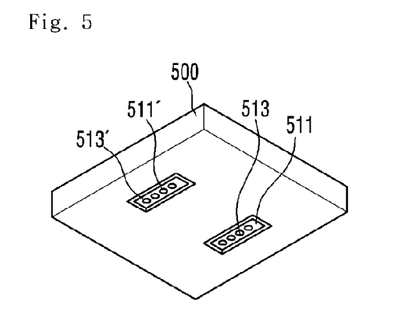
FIG. 5 is an embodiment of the present invention for describing an intermediate connection member to connect a plurality of lighting modules.

FIG. 4 is an embodiment of the present invention for describing a connection structure of a plurality of lighting modules, and FIG. 5 is an embodiment of the present invention for describing an intermediate connection member to connect a plurality of lighting modules.

In FIG. 4 and FIG. 5, one side of a first lighting module and a second lighting module of the lighting apparatus are contacted and connected to each other. Because the structures of the first lighting module and the second lighting module are described above, descriptions of them are omitted. The first connector 300A disposed on the outside of the base portion of the case 200 included in the first lighting module and the second connector 300B disposed on the external side face of the base portion of the case 200' included in the second lighting module are connected with the intermediate connection member 500.

The intermediate connection member 500 has a first insertion recess 511 and a second insertion goove511', and a first connection recess 513 and a second connection recess 513' formed within the first insertion recess 511 and the second insertion recess 511' respectively. An outer case 303a and a connection pin 301a of the first connector 300A are inserted into the first insertion recess 511 and the first connection recess 513 respectively, and an outer case 303b' and a connection pin 301b' of the second connector are inserted into the second insertion recess 511' and the second connection recess 513' respectively so as to mechanically connect and fix the first lighting module and the second lighting module.

Figure 6A:
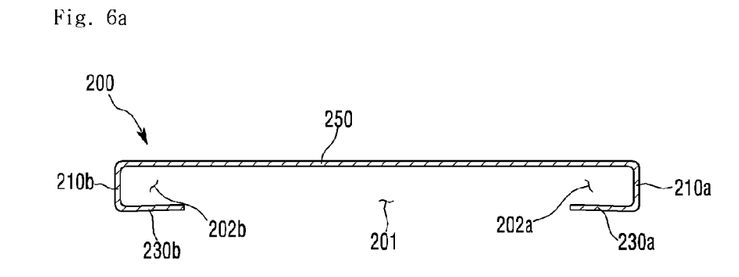
FIGS. 6a and 6b are embodiments of the present invention for describing a structure of a case.
Figure 6B:
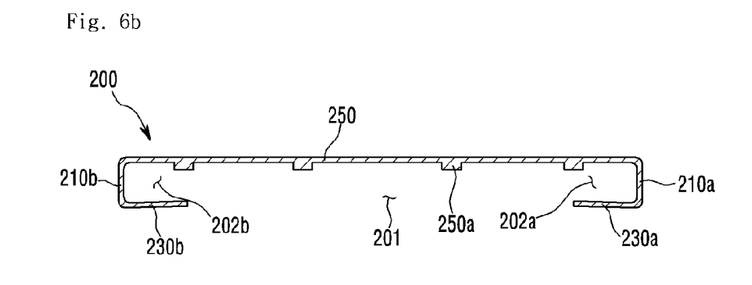

FIGS. 6a and 6b are embodiments of the present invention for describing a structure of a case.

As shown in FIG. 6a, the case 200 includes a first and a second extending portion 210a, 210b, a first flange portion 230a and a second flange portion 230b bent and extended respectively from a side of the first and the second extending portion 210a, 210b, and a base portion 250 bent and extended from the first extending portion 210a and connected to the other side of the second extending portion 210b.

As a result, the first and the second seat 202a, 202b are formed at both sides of the inside of the case 200, and the first flange portion 230a and the second flange portion 230b face each other with a distance so as to have the opening 201.

In addition, like FIG. 6b, the base portion 250 of the case 200 has one or more projection 250a extended from the internal side face, and the projection 250a increase an adhesion force among the reflector, the light guide plate, and the diffusing plate so as to fix and support the structures more stably. The projection 250a may have a line shape along the longitudinal direction of the case. In addition, the projection 250a may have a dot shape locally arranged at the front side of the base portion of the case.

The first flange portion 230a and the second flange portion 230b are extended and bent along the direction parallel to the base portion 250 with respect to the first and the second extending portion 210a, 210b respectively. However, it is desirable that the first flange portion 230a and the second flange portion 230b are bent at an acute angle (θ<90). Therefore, it is possible to fix and support more the structure inserted into the first seat 202a and the second seat 202b, i.e. the diffusing plate, the light guide plate, and the reflector.

In addition, the material of the case 200 can be metal, for example, aluminum or iron, and it is more desirable that the case can have elasticity.

In the embodiment of the present invention described above, for convenience sake of the description, the device including the first light source unit 150A, the second light source unit 150B, the first luminescent film 170a, the second luminescent film 170b, the light guide plate 110, the diffusing plate 190, and the reflector 130 is referred to as a light source module.

Figure 7:
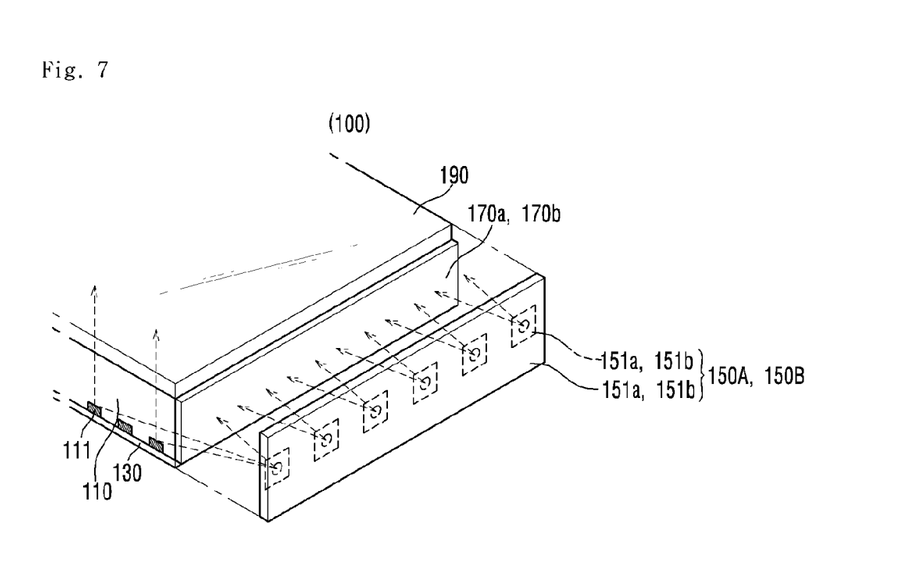
FIG. 7 is an embodiment of the present invention for describing a structure and principle of operation of a light source module placed within a case.

FIG. 7 is an embodiment of the present invention for describing a structure and a principle of operation of a light source module placed within a case.

As shown in the figure, the light source module 100 includes the light guide plate 110, the reflector 130, the light source unit 150A, 150B, the luminescent film 170a, 170b, and the diffusing plate 190.

The light guide plate 110 converts a point light source into a surface light source, and a specific pattern 111 is formed on a side so as to emit the light incident on the inside to the outside. The specific pattern 111 functions to diffuse or scatter the light and to emit the light to the outside. Such a light guide plate is made of transparent resin, and can be printed through the silk screen process.

The diffusing plate 190 can be placed above the light guide plate 110. The diffusing plate functions to uniformly emit the light incident on the inside of the light guide plate 110.

The reflector 130 is placed below the light guide plate 110, and prevents the light incident on the inside of the light guide plate 110 from emitting rearward of the light guide plate.

The light source unit 150A, 150B is placed by the side of the light guide plate 110. The light source unit 150A, 150B can be every possible device able to emit a light, and in the embodiment of the present invention, a light emitting diode 152a, 152b is used as the light emitting device. Such a light source unit 150A, 150B includes the substrate 151a, 151b and a plurality of light emitting diodes 152a, 152b disposed on the substrate 151a, 151b, and is optically connected to the light guide plate so as to irradiate the light emitted from the light source unit 150A, 150B onto the inside of the light guide plate 110.

The luminescent film 170a, 170b is placed between the light guide plate 110 and the light source unit 150A, 150B, and may includes various kinds of fluorescent material inside. In the case of including such a fluorescent material, a luminescent film 170a, 170b convert a part of the wavelength of the emitted light from the light source unit 150A, 150B to change the color of the light.

While not shown, the light source unit 150A, 150B and the luminescent film 170a, 170b are placed respectively on the seat 202a, 202b of the inside of the case 200 described in the FIG. 2. In addition, the both respective ends of the light guide plate 110, the diffusing plate 190, and the reflector 130 are placed to be inserted into the seat 202a, 202b of the inside of the case 200.

Figure 8:
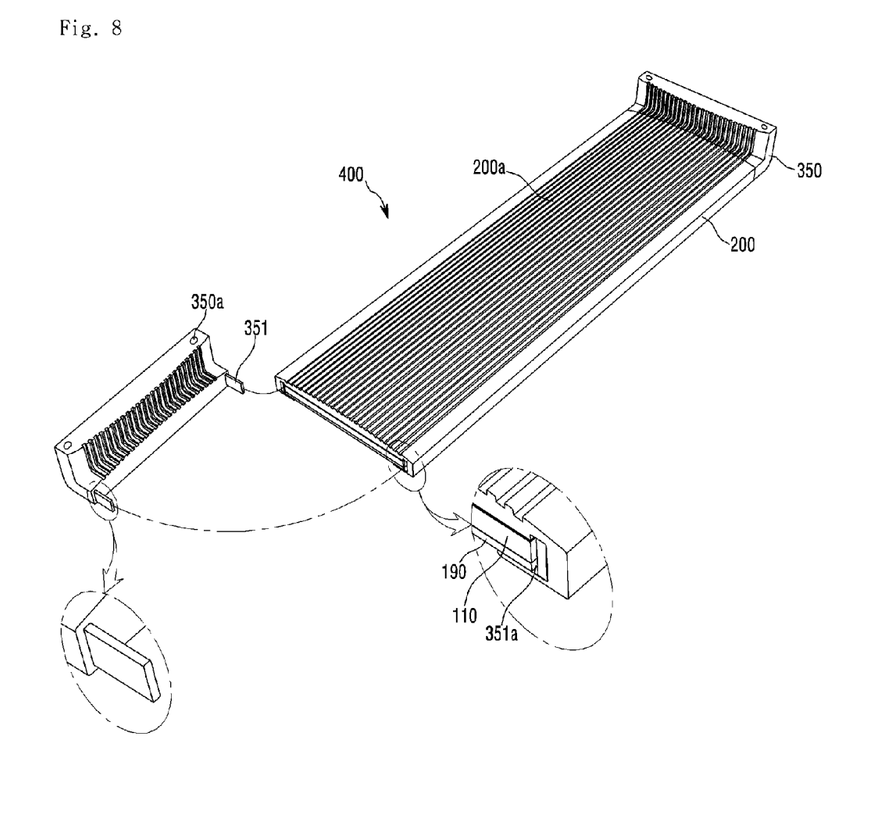
FIG. 8 is an embodiment of the present invention for describing another structure of a lighting module.

FIG. 8 is an embodiment of the present invention for describing another structure of a lighting module.

As shown in the figure, the lighting module includes the case 200 including the light source module inside thereof and a end cap 350 connected to the both ends of the case 200 and bent and extended along the opposite direction the light is irradiated.

The case 200 has a heat radiating groove 200a formed on a side of the base portion 250, and the end cap 350 has a projection 351 on an end thereof. The case 200 has a receiving recess 351a corresponding to the projection 351, and the end cap has a recess 350a.

The base portion 250 of the case may have a convex shape to enlarge the surface area of a side of the base portion for effective heat radiating of the inner light source.

The end cap 350 bent and extended rearward is connected to the both ends of the case 200. It is desirable that the end cap 350 is bent at a right angle, and is formed continuously to connect with the case 200. In the embodiment, the heat radiating groove 200a is formed continuously to connect with a side of the case 200, and the size of the end cap 350 is the same as a side face of the case 200.

The projection 351 is disposed on the side connected to the case 200 of the end cap 350, and can be connected to the corresponding receiving recess 351a disposed on the front, rear, and side face of the case 200 by insertion. In addition, the end cap 350 has the recess 350a so as to be used for various attachments to the wall or ceiling.

Figure 9:
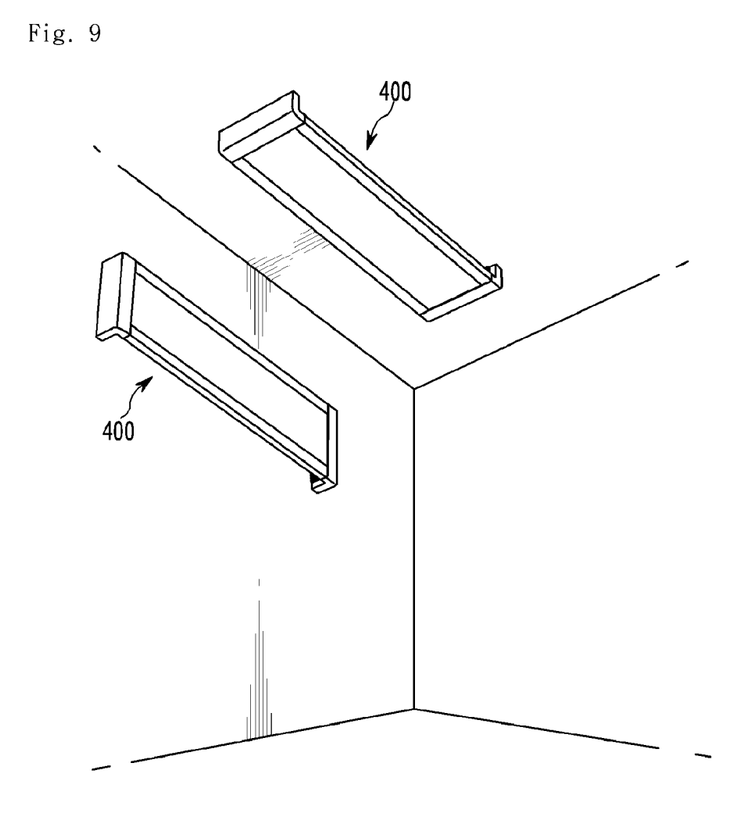
FIGS. 9 and 10 are embodiments of the present invention showing installation status of a lighting module.
Figure 10:
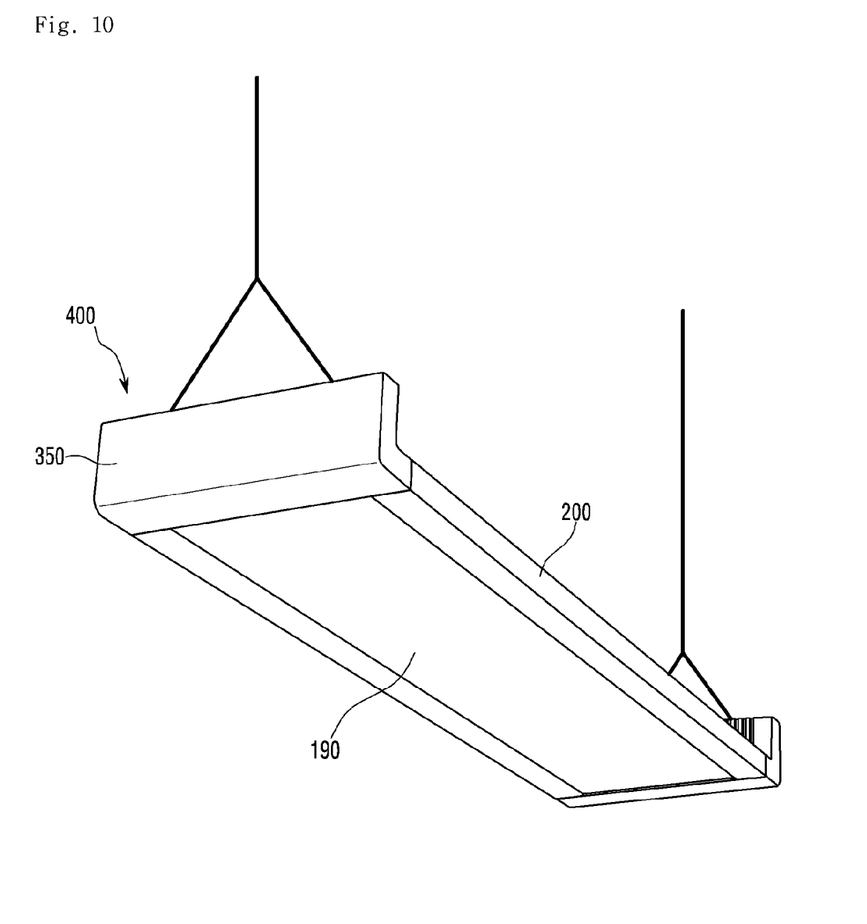

FIG. 9 is showing installation status of a lighting module 400 according to the present invention, and the lighting module can be installed to the surface of a wall or ceiling. Here, the installed surface and the case 200 or the lighting module 400 are a predetermined distant apart by the end cap 350 being bent towards the rear side of the lighting module 400. Especially when the lighting module 400 according to the present invention is installed to the surface of a wall, the secured space as such can be used for placing a ballast stabilizer or can include heat radiating structure having a volume not exceeding the space to help heat radiation of the inner light source of the lighting module 400. In addition, the lighting module can be installed to the ceiling in pendent form as FIG. 10.

As the occasion demand, a plurality of the lighting modules 400 can be connected by using predetermined connection member (not shown) and a receiving recess 351a, and can be used as an extended form by connecting the end cap 350 to the both ends when it reached the intended length.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A lighting module comprising:
   a case including an opening from which light is emitted, a base portion corresponding to the opening, and a seat on at least one side of the base portion;
   a light source unit disposed on the seat;
   a light guide plate placed within the case and optically connected with the light source unit; and
   a diffusing plate placed within the case and placed below the light guide plate,
   wherein the lighting source unit includes a substrate, a plurality of light emitting diodes (LEDs) disposed on the substrate, and a sub-reflector which is disposed on the substrate and covers the plurality of the LEDs, and wherein at least 90% of the light emitted from the LEDs is directly irradiated onto the light guide plate.

2. The lighting module of claim 1, wherein light having an outmost orientation angle among the light emitted from the LEDs is directly irradiated onto the light guide plate.

3. The lighting module of claim 1, wherein the base portion of the case includes at least one projection, and wherein the projection fixes and supports the light guide plate.

4. The lighting module of claim 1, further comprising a reflector which is placed between the light guide plate and the base portion and reflects the light emitted from the light source unit toward the diffusing plate.

5. The lighting module of claim 1, wherein the case includes:
 a first and a second extending portions which extend from both ends of the base portion in a perpendicular direction respectively; and
 a first and a second flange portions which extend from ends of the first and the second extending portions respectively.

6. The lighting module of claim 1, further comprising a luminescent film placed between the light source unit and the light guide plate.

7. The lighting module of claim 1, further comprising an end cap connected with an end of the case.

8. The lighting module of claim 7, wherein the end cap is bent and extended in a reverse direction to a direction in which the light is irradiated.

9. The lighting module of claim 1, further comprising a connector disposed on an external surface of the case, wherein the connector includes:
 a plurality of connection pins arranged inside thereof; and
 an external case covering the plurality of connection pins.

10. The lighting module of claim 9, further comprising a connection member coupled to the connector, wherein the connection member includes:
 a plurality of insertion recesses disposed in the plurality of connection pins of the connector; and
 a connection recess disposed in the external case of the connector.

11. A lighting module comprising:
 a case including an opening from which light is emitted, a base portion corresponding to the opening, and a seat on at least one side of the base portion;
 at least one light source unit which includes at least one light emitting device and is disposed on the seat;
 a light guide plate placed within the case and optically connected with the light source unit; and
 a diffusing plate placed within the case and placed below the light guide plate,
 wherein the base portion of the case includes a plurality of recesses on a side thereof.

12. The lighting module of claim 11, wherein the case is formed as one plate with the opening,
 the seat of the case includes a first seat and a second seat formed by bending the both ends of the plate such that the both ends face each other,
 the at least one light source unit includes a first light source unit and a second light source unit placed in the first and second seats of the case,
 the light guide plate is placed in the first and second seats and placed between the first and the second light source units, so that the light incident from the first and the second light source units is emitted toward the opening, and the diffusing plate is placed in the first and the second seats and placed between the light guide plate and the opening, so that the light emitted from the light guide plate is diffused to the opening.

13. The lighting module of claim 11, wherein the case has a cross section of which both sides are parallel to each other in a longitudinal direction thereof.

14. The lighting module of claim 11, further comprising a reflector which is placed between the light guide plate and the base portion and reflects the light emitted from the light source unit to the direction of the diffusing plate.

15. The lighting module of claim 11, further comprising a luminescent film placed between the light source unit and the light guide plate.

16. The lighting module of claim 11, further comprising an end cap connected with an end of the case.

17. The lighting module of claim 16, wherein the end cap is bent and extended in a reverse direction to a direction in which the light is irradiated.

18. The lighting module of claim 11, further comprising a connector disposed on an external surface of the case, wherein the connector includes:
 a plurality of connection pins arranged inside thereof; and
 an external case covering the plurality of connection pins.

19. The lighting module of claim 18, further comprising a connection member coupled to the connector, wherein the connection member includes:
 a plurality of insertion recesses disposed in the plurality of connection pins of the connector; and
 a connection recess disposed in the external case of the connector.

20. A lighting apparatus comprising a first lighting module, a second lighting module and a connection member,
 wherein the first lighting module includes:
  a first case including a first opening from which light is emitted, a first base portion corresponding to the first opening, and a first seat on at least one side of the first base portion;
  a first light source unit which is disposed on the first seat an includes a first light emitting device and a first sub-reflector covering the first light emitting device;
  a first light guide plate placed within the first case and optically connected with the first light source unit; and
  a first connector disposed on an external surface of the first case,
 wherein the second lighting module includes:
  a second case including a second opening from which light is emitted, a second base portion corresponding to the second opening, and a second seat on at least one side of the second base portion;
  a second light source unit which is disposed on the second seat and includes a second light emitting device and a second sub-reflector covering the second light emitting device;
  a second light guide plate placed within the second case and optically connected with the second light source unit; and
  a second connector disposed on an external surface of the second case, and
 wherein the connection member is coupled to the first connector and the second connector, so as to mechanically connect and fix the first lighting module and the second lighting module.

* * * * *